US008672486B2

(12) United States Patent
Travis (10) Patent No.: US 8,672,486 B2
(45) Date of Patent: Mar. 18, 2014

(54) WIDE FIELD-OF-VIEW PROJECTOR

(75) Inventor: Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 13/180,312

(22) Filed: Jul. 11, 2011

(65) Prior Publication Data

US 2013/0016324 A1   Jan. 17, 2013

(51) Int. Cl.
*G03B 21/14* (2006.01)
(52) U.S. Cl.
USPC ............... 353/79; 353/99; 385/146; 385/901
(58) Field of Classification Search
USPC .......... 353/79, 13, 12, 81, 74, 77, 78; 349/11; 359/11, 13, 460, 615; 385/133, 901
See application file for complete search history.

(56) References Cited

U.S. PATENT DOCUMENTS

| 5,625,736 | A | 4/1997 | Veligdan |
| 6,870,671 | B2 * | 3/2005 | Travis ........................... 359/443 |
| 7,410,286 | B2 | 8/2008 | Travis |
| 7,736,004 | B2 * | 6/2010 | Hong et al. ...................... 353/7 |
| 7,976,169 | B2 * | 7/2011 | Liu et al. ........................ 353/31 |
| 8,152,315 | B2 * | 4/2012 | Travis et al. .................. 353/122 |
| 2004/0095560 | A1 * | 5/2004 | Travis et al. .................... 353/79 |
| 2008/0316768 | A1 | 12/2008 | Travis |
| 2010/0091254 | A1 | 4/2010 | Travis et al. |
| 2010/0150498 | A1 | 6/2010 | Large |
| 2010/0231498 | A1 | 9/2010 | Large et al. |

FOREIGN PATENT DOCUMENTS

WO     0172037 A1   9/2001

OTHER PUBLICATIONS

Travis, et al., "Flat Projection for 3-D", Retrieved at <<http://ieeexplore.ieee.org/stamp/stamp.jsp?tp=&arnumber=1605201>>, Proceedings of the IEEE, vol. 94, No. 3, Mar. 2006, pp. 539-549.

* cited by examiner

*Primary Examiner* — William C Dowling
(74) *Attorney, Agent, or Firm* — Jeremy Snodgrass; Glen Johnson; Micky Minhas (57) ABSTRACT

This document describes various techniques for implementing a wide field-of-view projector. A wide field-of-view projector may include a spatial light modulator configured to inject light rays into an input wedge. The input wedge acts to output the light rays with an increased fan-out angle. In an embodiment, the spatial light modulator is controlled to inject light rays into the input wedge effective to project an image from the surface of an output wedge that is positioned proximate, and receives light rays with an increased fan-out angle from, the input wedge.

16 Claims, 7 Drawing Sheets

WIDE FIELD-OF-VIEW PROJECTOR

BACKGROUND

Rays of light injected into a thick end of a wedge-shaped light guide, which tapers from a thick end to a thin end, will reflect back and forth at progressively steeper angles until exiting the wedge when a "critical angle" is reached. A projection display can be made by pointing a video projector into the thick end of the wedge-shaped light guide to project an image from the face of the panel. Typical video projectors using wedge-shaped light guides can encounter one or more problems. First, the projected image often includes visible bands, each illuminated by rays, which have undergone one reflection more or less than rays in adjacent bands. Second, conventional projectors cannot focus on two different locations at the same time. Third, video projectors generally cannot fan-out an image 90 degrees in wedge-shaped light guides.

SUMMARY

This document describes techniques and apparatuses for implementing a wide field-of-view projector. A wide field-of-view projector may include a spatial light modulator configured to inject light rays into an input wedge. The input wedge acts to output the light rays with an increased fan-out angle. In an embodiment, the spatial light modulator is controlled to inject light rays into the input wedge effective to project an image from the surface of an output wedge that is positioned proximate, and receives light rays with an increased fan-out angle from, the input wedge.

This summary is provided to introduce simplified concepts in a simplified form that are further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses for implementing a wide field-of-view projector are described with reference to the following drawings. The same numbers are used throughout the drawings to reference like features and components.

DETAILED DESCRIPTION

Overview

This document describes various apparatuses and techniques for implementing a wide field-of-view projector. The wide field-of-view projector includes a spatial light modulator configured to inject light rays into an input wedge. The input wedge acts to output the light rays with an increased fan-out angle.

Figure 1:
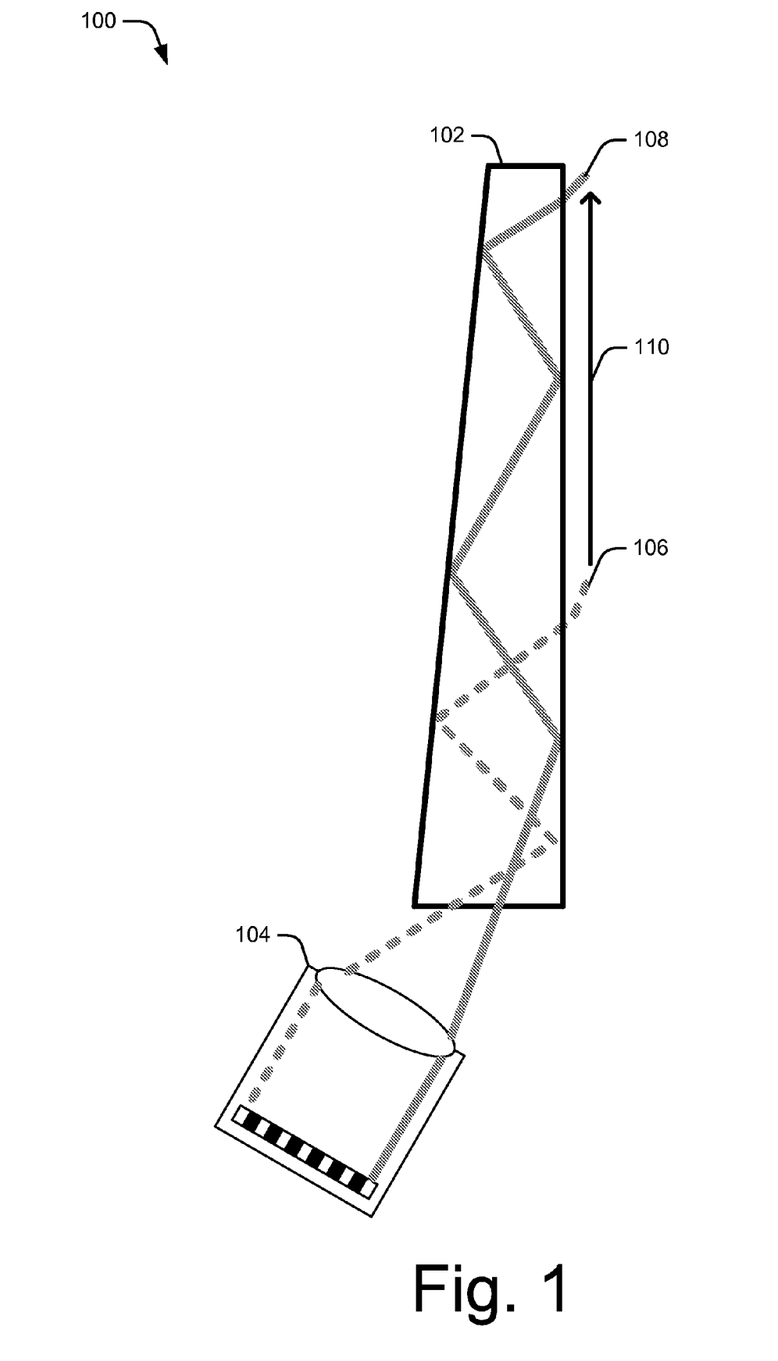
FIG. 1 illustrates an example of a projector and an output wedge.

In an embodiment, the spatial light modulator is controlled to inject light rays into the input wedge effective to project an image from the surface of an output wedge that is positioned proximate, and receives light rays with an increased fan-out angle from, the input wedge. Consider for example, FIG. 1, which illustrates an example embodiment 100 of a wedge 102 and a projector 104. Projector 104 projects light rays 106 and 108 into the thick end of the wedge causing the light rays to reflect back and forth at progressively steeper angles until a "critical angle" is reached, at which point the light rays exit the wedge causing a projected image 110 to emerge from the face of the wedge.

Example Environment

Figure 2:
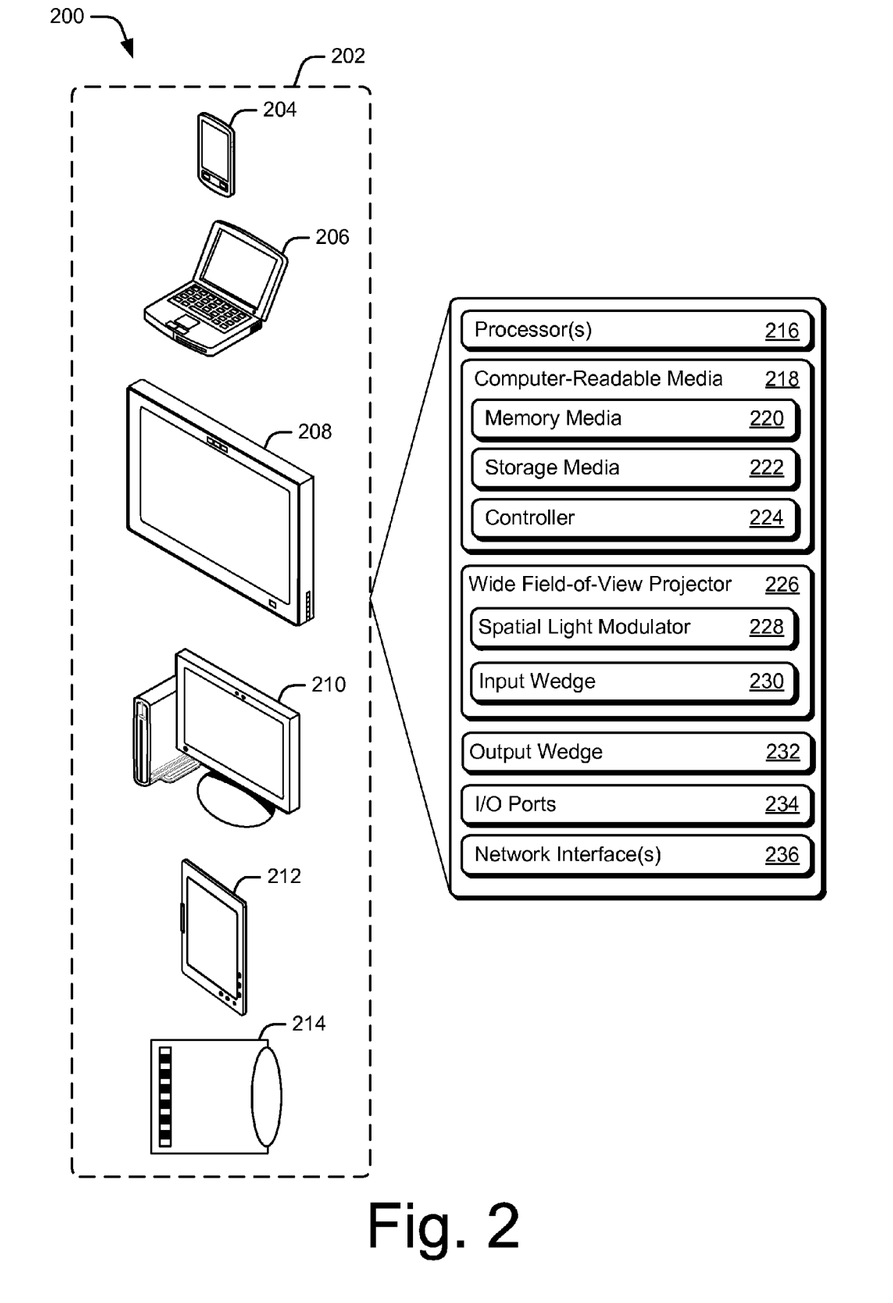
FIG. 2 illustrates an example environment in which a wide field-of-view projector can be implemented.

FIG. 2 is an illustration of an example environment 200 in which a wide field-of-view projector can be implemented. Environment 200 can be implemented in a display device 202 which is illustrated, by way of example and not limitation, as one of a smart phone 204, laptop computer 206, television device 208, desktop computer 210, or a tablet computer 212. In some cases, display device 202 can be implemented without a display screen, as a holographic projector device 214 to output a holographic image into air.

Display device 202 includes processor(s) 216 and computer-readable media 218, which includes memory media 220 and storage media 222. Computer-readable media 218 also includes spatial light modulator controller (controller) 224. How controller 224 is implemented and used varies, and is described as part of the methods discussed below.

Display device 202 also includes a wide field-of-view projector 226 that includes a spatial light modulator 228 and an input wedge light guide (input wedge) 230. Wide field-of-view projector 226 outputs a holographic image with a wide fan-out angle that can be displayed in air or injected into output wedge light guide (output wedge) 232 to generate an image (e.g., a 2D or 3D image) projected from the face of output wedge 232. As described herein, the terms "input wedge" and "output wedge" describe a wedge-shaped lens that tapers in at least one direction.

I/O ports 234 of display device 202 enable interaction with other devices, media, or users. I/O ports 234 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, or parallel ports.

Display device 202 may also include network interface(s) 236 for communicating data over wired, wireless, or optical networks. Data communicated over such networks may include 2D, 3D, or holographic content. By way of example and not limitation, network interface 236 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 3:
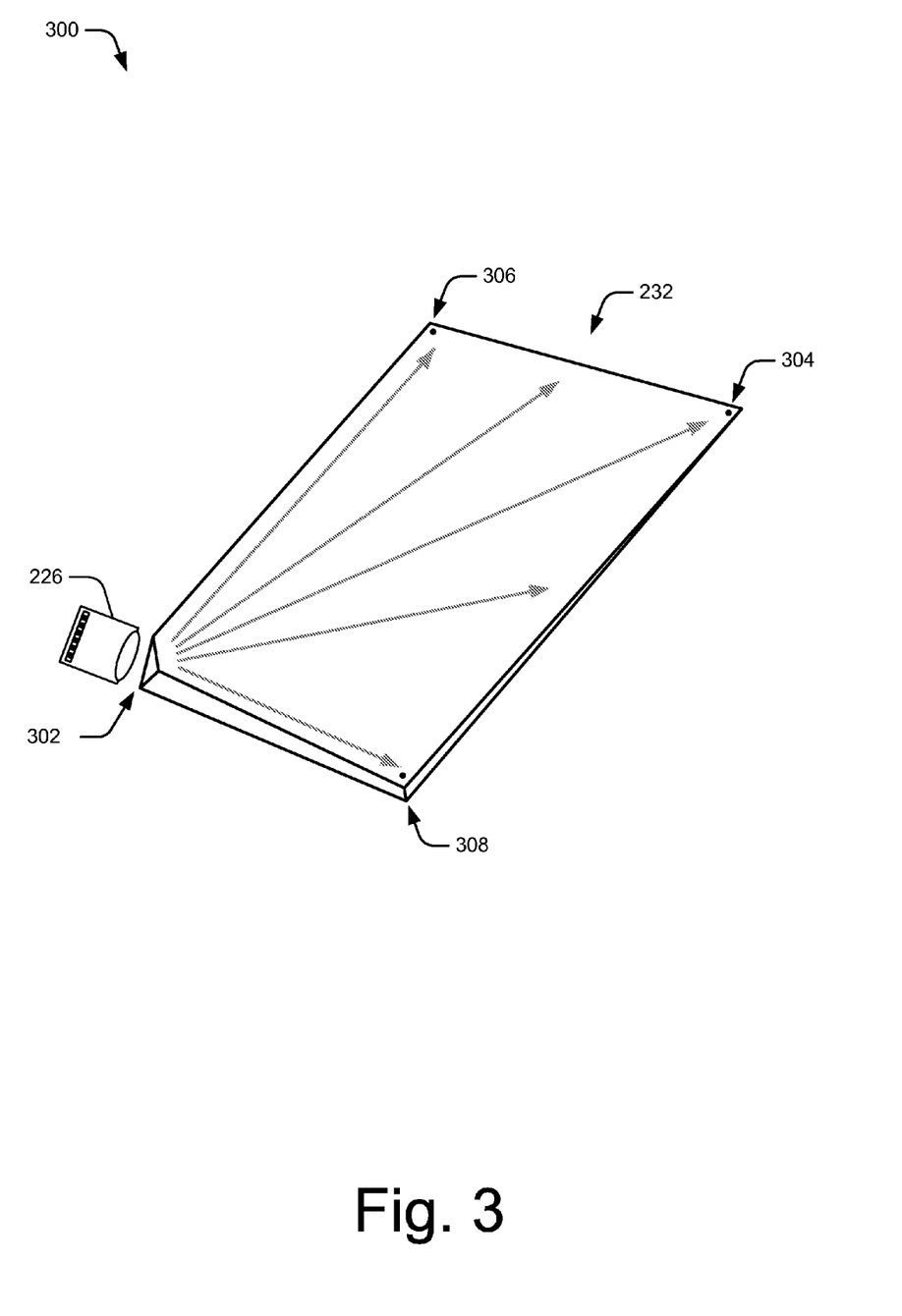
FIG. 3 is a more-detailed illustration of the output wedge illustrated in FIG. 2.

FIG. 3 illustrates a detailed example 300 of output wedge 232 in more detail. In this detailed example, output wedge 232 is configured to taper from a thick corner 302 to a thin corner 304 that is positioned diagonally opposite from the thick corner. It is to be appreciated, however, that any type of wedge-shaped lens that tapers in at least one direction may be used. In this example, wide field-of-view projector 226 projects light rays into the thick corner 302 of output wedge 232 to make a projected image emerge from the face of the wedge.

A conventional projector, in contrast to wide field-of-view projector 226, may project an image having visible bands, each illuminated by rays which have undergone one reflection more or less than rays in adjacent bands. For example, some of the rays can reflect off of output wedge 232 nine times, whereas other of the rays can reflect off the output wedge ten times before exiting the wedge. Second, conventional projectors cannot focus on two different locations at the same time. In FIG. 3, for example, a focus is required on both thick corner 302 and thin corner 304 at the same time. With a conventional projector, therefore, the image projected from the thick and thin corners of output wedge 232 is not simultaneously in focus. Third, conventional video projectors generally cannot fan-out an image 90 degrees in a wedge. With this configuration, therefore, a conventional video projector could not project light rays that reach both corners of the output wedge (e.g., corners similar to 306 and 308).

Wide field-of-view projector 226, however, includes spatial light modulator 228. Spatial light modulator 228 imposes spatially-varying modulation on a beam of light, and can be implemented to project a true 3D floating image, known as a holograph. Spatial light modulator 228 can be controlled by controller 224 to cause light rays to focus either near or far. An image projected from a holographic projector, therefore, can be pre-distorted to prevent aberrations of the wedge-shaped light guide.

Spatial light modulator 228 may be a liquid crystal phase modulator that is composed of multiple liquid crystal displays (LCDs). Alternately, spatial light modulator 228 may be a liquid crystal amplitude modulator, or another type of spatial light modulator. When spatial light modulator 228 is configured as a liquid crystal phase modulator, the LCDs can be controlled by controller 224 to impose a superposition of gratings. Then, when the liquid crystals of spatial light modulator are illuminated with parallel rays of light from a light source (e.g., light emitting diodes (LEDs), light engines, or lasers), the superimposition of gratings on the spatial light modulator can be controlled to create several distant spot sources of light in the manner needed to synthesize a holographic image.

While spatial light modulator 228 by itself can solve many of the problems typically encountered when using conventional projectors with wedge-shaped light guides, typical spatial light modulators modulate only phase or amplitude (not both) which makes pre-distortion difficult. In addition, typical spatial light modulators have a fan-out angle that is only three degrees. For example, each LCD in spatial light modulator 228 can diffract light at an angle of three degrees. Therefore, some spatial light modulators may be unable to project an image with a fan-out angle of 90 degrees to reach corners 306 and 308 of output wedge 232.

In order to increase the fan-out angle of spatial light modulator 228, wide field-of-view projector 226 couples spatial light modulator 228 to an input wedge 230. Input wedge 230 receives the light rays from spatial light modulator 228 to output the light rays with an increased fan-out angle.

Figure 4:
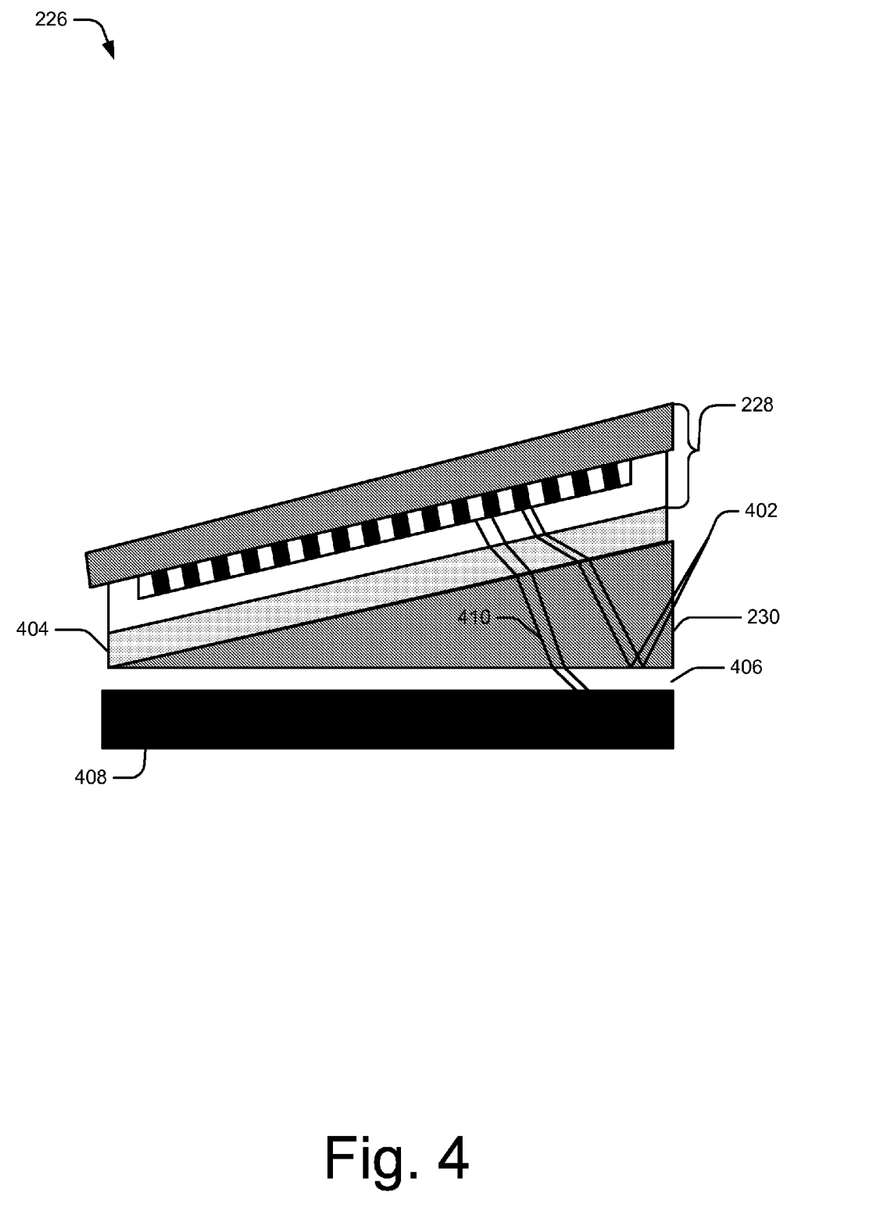
FIG. 4 is a more-detailed illustration of the wide field-of-view projector illustrated in FIG. 2.

FIG. 4 illustrates a detailed example of wide field-of-view projector 226 configured with input wedge 230 positioned proximate spatial light modulator 228. Spatial light modulator 228 outputs modulated light rays that are received as an input to input wedge 230. In this example, spatial light modulator 228 is controlled to project light rays at any location on the surface of input wedge 230. Input wedge 230 receives the modulated light rays from spatial light modulator 228 as input, and outputs the light rays at an increased fan-out angle. Thus, the input wedge amplifies a fan-out angle of the light rays. For example, a light ray 402 exits the input wedge at approximately 45 degrees. The input wedge, therefore, enables the light rays of spatial light modulator 228 to fan-out at an angle that is an integer multiple of three degrees, thereby increasing the field-of-view of the projected images from the spatial light modulator.

In this detailed example, wide field-of-view projector 226 includes an aerogel 404, an air gap 406, and an absorption layer 408. Absorption layer 408 is positioned beneath the input wedge and absorbs un-diffracted light rays from spatial light modulator 228. Controller 224 can modulate an amplitude or intensity of the spatial light modulator 228 (when the spatial light modulator is configured as a phase modulator) by causing the spatial light modulator to output light rays through a sufficiently large angle so that the light rays pass through the input wedge and are absorbed by the absorption layer. For example, light ray 402 is injected into input wedge 230 to reflect off of the bottom of the input wedge and exit the input wedge at a 45 degree angle. In contrast, a light ray 410 is injected into the input wedge to exit at the bottom of the wedge and be absorbed by absorption layer 408.

In this detailed example, aerogel 404 is positioned between the spatial light modulator 228 and input wedge 230. Air gap 406 is positioned between the input wedge and absorption layer 408. Controller 224 controls spatial light modulator 228 to inject a light ray through the aerogel and into input wedge 230 at an input angle effective to reflect the light ray off of the bottom of the input wedge. Controller 224 can change the input angle to cause the light ray to exit input wedge 230 at the bottom of the wedge and be absorbed by absorption layer 408. With a small change to the input angle, therefore, the controller can control whether a light ray reflects off of the bottom of input wedge 230 or is absorbed by absorption layer 408.

Wide field-of-view projector 226 outputs a holographic image with an increased fan-out angle that can be displayed in air. In some cases, the output from wide field-of-view projector 226 can be injected into output wedge 232 to project an image from the face of the output wedge.

Figure 5A:
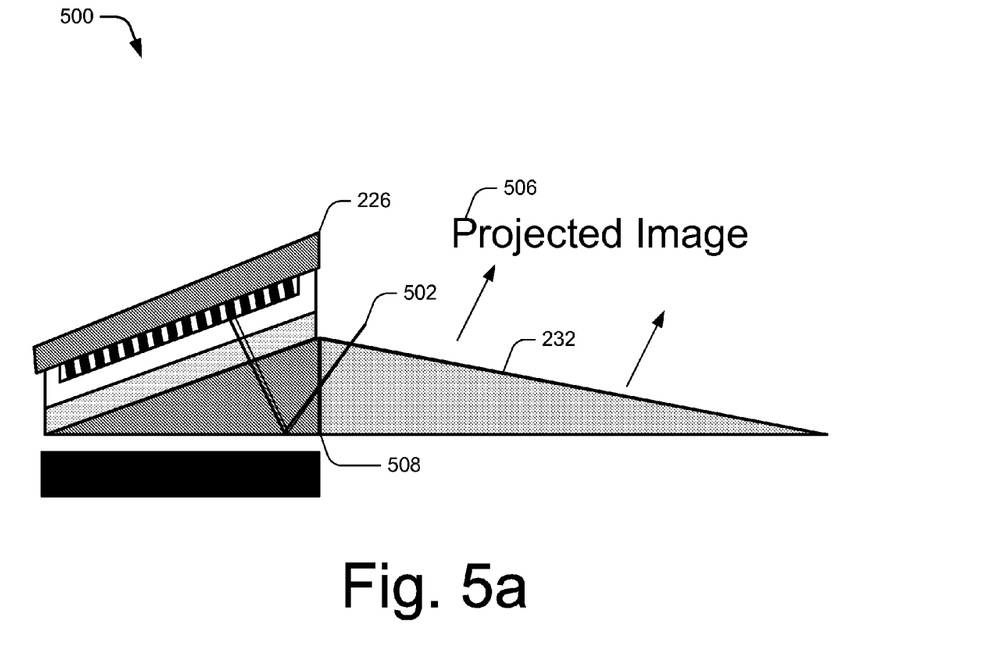
FIGS. 5a and 5b are more-detailed illustrations of the wide field-of-view projector and the output wedge illustrated in FIG. 2.
Figure 5B:
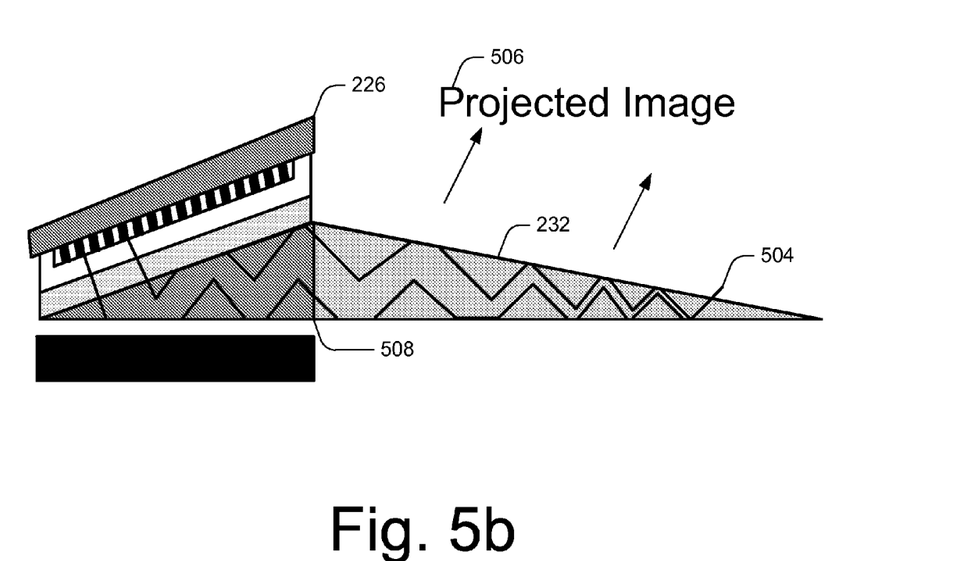

FIGS. 5a and 5b illustrate a detailed example 500 of wide field-of-view projector 226, from FIG. 4, injecting light into an output wedge 232. In this detailed example, a thick end of input wedge 230 is positioned proximate a corresponding thick end of output wedge 232. Wide field-of-view projector 226 outputs light rays 502 (FIGS. 5a) and 504 (FIG. 5b) into the output wedge. In an embodiment, wide field-of-view projector 226 outputs light rays into a thick corner of the output wedge as illustrated in FIG. 3. Output wedge 232 receives light rays 502 and 504 from input wedge 230 and outputs the light rays over a surface of the output wedge to project an image 506 (e.g., a 2D or 3D image). In this detailed example, input wedge 230 is shorter than output wedge 232. In some cases, however, output wedge 232 may be shorter than input wedge 230, or input wedge 230 and output wedge 232 may be equal in length.

Controller 224 is implemented to control spatial light modulator 228 to inject light rays 502 and 504 into input wedge 230 effective to project image 506 from the surface of output wedge 232. Controller 224 varies an input position at which the light rays enter input wedge 230 from spatial light modulator 228 to control an output at which the light rays exit output wedge 232 as image 506.

Controller 224 injects a light ray into a thick end of input wedge 230 effective to project the light ray from a corresponding thick end of the surface of output wedge 232. For example, light ray 502 is injected into the thick end of input wedge 230 and exits output wedge 232 near the thick end of the output wedge. Note that light ray 502 reflects just once off of the bottom of input wedge 230 so that by the time light ray 502 reaches a transition 508 between the input wedge and the output wedge, the angle of light ray 502 is close to the critical angle. Thus, light ray 502 exits the output wedge without reflecting in the output wedge.

In contrast, controller 224 injects a light ray into a thin end of input wedge 230 effective to project the light ray from a corresponding thin end of the surface of output wedge 232. For example, light ray 504 is injected into the thin end of input wedge 230 and exits output wedge 232 near the thin end of the output wedge. Note that light ray 504 reflects multiple times in both input wedge 230 and output wedge 232 before it finally exits output wedge 232, when the critical angle is reached, in the thin end of the output wedge.

Controller 224 controls spatial light modulator 228 to vary a thickness of the light rays injected into input wedge 230 to cause the light rays to converge to a point when projected from the surface of output wedge 232. For example, light ray 502 is thin when injected into input wedge 230 and converges to a point when it exits output wedge 232. In contrast, light ray 504 is thick when injected into input wedge 230 and converges to a point when it exits output wedge 232. The thickness of the light rays varies because the light rays injected into the thin end of input wedge 230 travel a greater distance in input wedge 230 and output wedge 232 before exiting output wedge 232 than the light rays that are injected into input wedge 230 at the thick end. To vary the thickness of the light rays, controller 224 can control spatial light modulator 228 to vary a size of the superimposition of gratings.

Additionally, controller 224 controls a direction that the light rays exit input wedge 230. For example, at transition 508, light ray 502 is going upwards, whereas light ray 504 is going downwards. By controlling the direction that the light rays exit the input wedge, controller 224 is able to ensure that the display of image 506 is continuous.

Example Method

Figure 6:
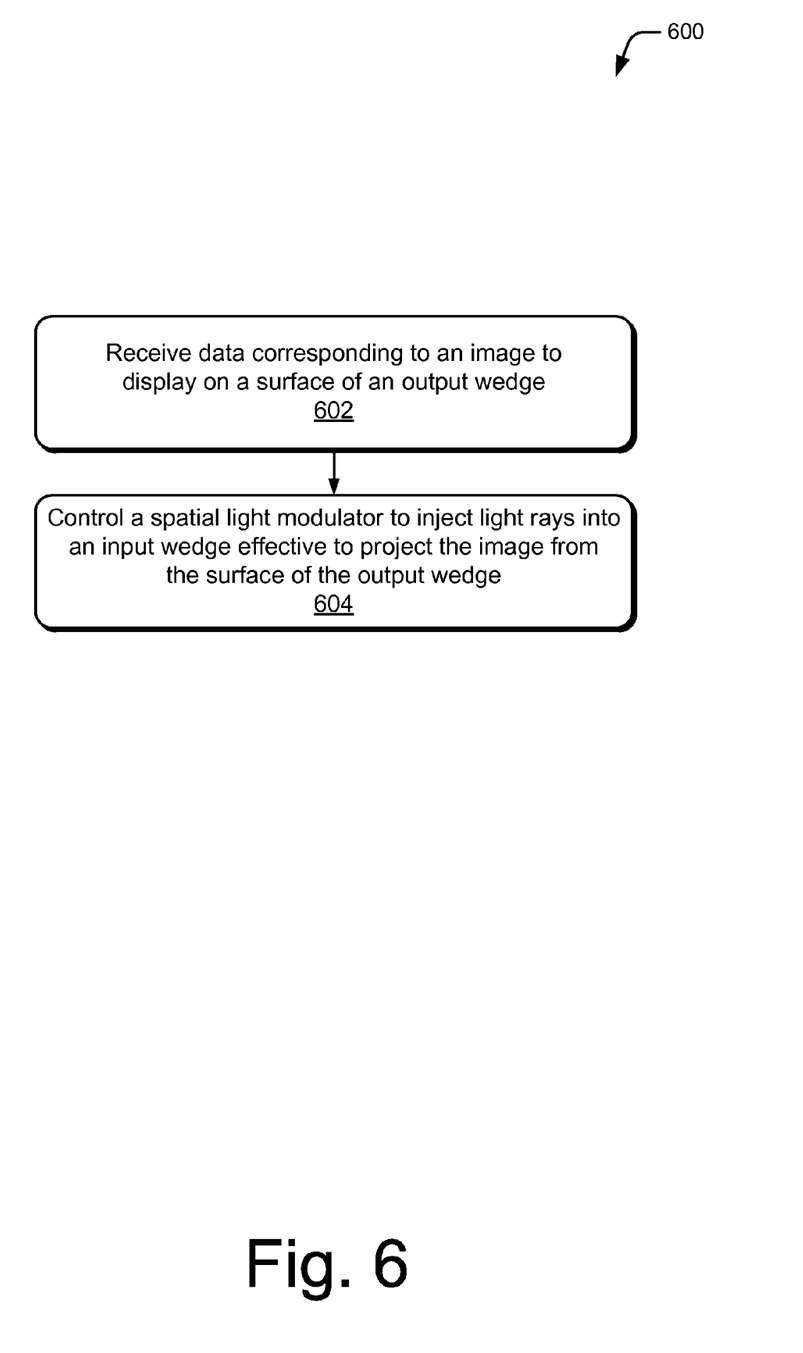
FIG. 6 illustrates an example method for controlling a wide field-of-view projector.

FIG. 6 is a flow diagram depicting an example method 600 for controlling the spatial light modulator to inject light rays into the input wedge. Block 602 receives data corresponding to an image to display on a surface of an output wedge (e.g., video data corresponding to a movie or to television programming) Block 604 controls a spatial light modulator to inject light rays into an input wedge effective to project the image from the surface of the output wedge that is positioned proximate the input wedge. For example, as illustrated in FIG. 5, the controller 224 controls the spatial light modulator 228 to inject the light rays 502 and 504 into the input wedge 230 effective to project the image 506 from the surface of the output wedge 232.

Controller 224 can be implemented to control spatial light modulator 228 to inject the light rays into a thick end of input wedge 230 effective to project the light rays from the corresponding thick end of the surface of output wedge 232. In addition, controller 224 can be implemented to control spatial light modulator 228 to inject the light rays into a thin end of input wedge 230 effective to project the light rays from a corresponding thin end of the surface of output wedge 232. In some cases, controller 224 is implemented to control spatial light modulator 228 to vary a thickness of the light rays injected into input wedge 230 so that the light rays converge to a point when projected from the surface of output wedge 232.

Example Device

Figure 7:
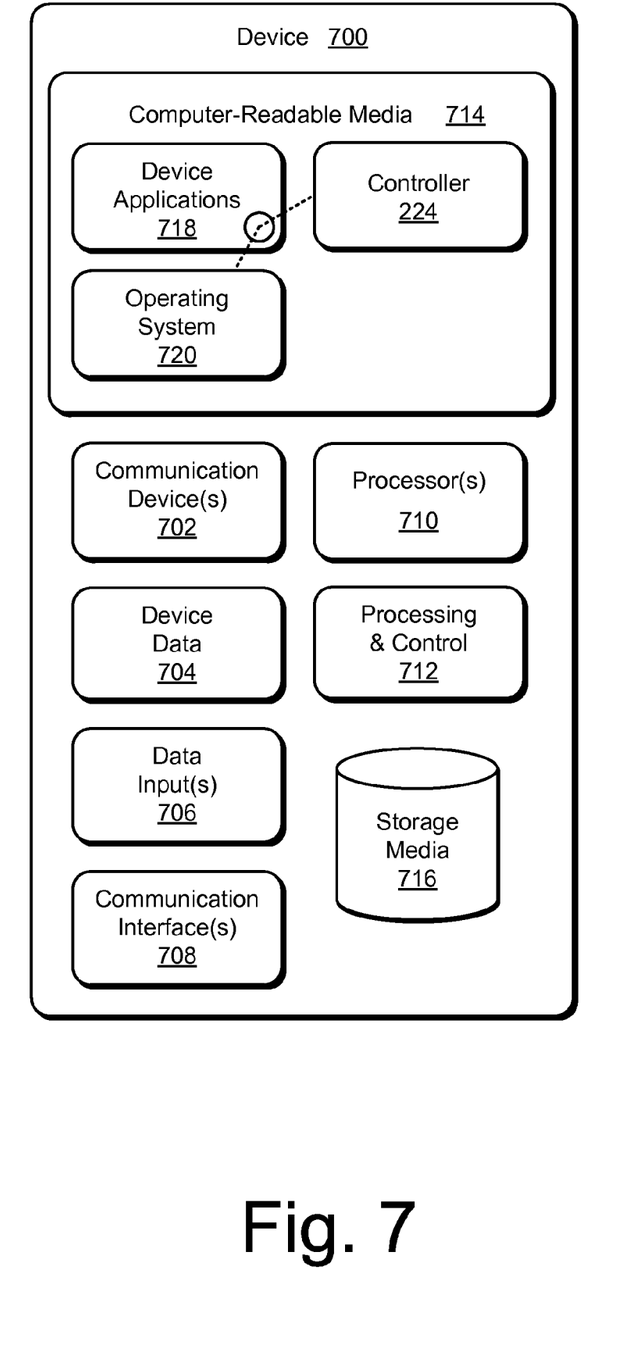
FIG. 7 illustrates an example device in which techniques for a wide field-of-view projector can be implemented.

FIG. 7 illustrates various components of example device 700 that can be implemented as any type of client, server, and/or display device as described with reference to the previous FIGS. 1-6 to implement techniques enabling a wide field-of-view projector. In embodiments, device 700 can be implemented as one or a combination of a wired and/or wireless device, as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 700 may also be associated with a viewer (e.g., a person or user) and/or an entity that operates the device such that a device describes logical devices that include users, software, firmware, and/or a combination of devices.

Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708, which can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like), which process various computer-executable instructions to control the operation of device 700 and to enable techniques for implementing a wide field-of-view projector. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable storage media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable storage media 714 provides data storage mechanisms to store the device data 704, as well as various device applications 718 and any other types of information and/or data related to operational aspects of device 700. For example, an operating system 720 can be maintained as a computer application with the computer-readable storage media 714 and executed on processors 710. The device applications 718 may include a device manager, such as any form of a control application, software application, signal-processing and control module, code that is native to a particular device, a hardware abstraction layer for a particular device, and so on.

The device applications 718 also include any system components or modules to implement techniques using or enabling a wide field-of-view projector. In this example, the device applications 718 can include controller 224 for controlling a wide field-of-view projector.

Conclusion

This document describes various apparatuses and techniques for implementing a wide field-of-view projector. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A projector comprising:
   a spatial light modulator configured to output modulated light rays;
   an input wedge positioned proximate the spatial light modulator, the input wedge configured to receive the modulated light rays from the spatial light modulator and to output the light rays at an increased fan-out angle into a thick corner of an output wedge; and
   the output wedge configured to receive the light rays, at the increased fan-out angle, from the input wedge, and to output the light rays over a surface of the output wedge to generate an image.

2. A projector as described in claim 1, wherein the spatial light modulator comprises a holographic projector.

3. A projector as described in claim 1, wherein the spatial light modulator comprises liquid crystal displays.

4. A projector as described in claim 1, wherein the spatial light modulator comprises a phase modulator.

5. A projector as described in claim 1, wherein the spatial light modulator comprises an amplitude modulator.

6. A projector as described in claim 1, further comprising an aerogel positioned between the spatial light modulator and the input wedge.

7. A projector as described in claim 1, further comprising an absorption layer configured to absorb the light rays from the spatial light modulator, wherein the spatial light modulator is configured to modulate an amplitude of the light rays by controlling whether the light rays reflect off of a bottom of the input wedge or are absorbed by the absorption layer.

8. A method comprising:
   receiving data corresponding to an image to display on a surface of an output wedge; and
   controlling a spatial light modulator to inject light rays into an input wedge, that is positioned proximate the output wedge, effective to project the image from the surface of the output wedge, the controlling further comprising controlling the spatial light modulator to vary a thickness of the light rays injected into the input wedge so that the light rays converge to a point when projected from the surface of the output wedge.

9. A method as described in claim 8, wherein a thick end of the input wedge is positioned proximate a corresponding thick end of the output wedge.

10. A method as described in claim 9, wherein the controlling further comprises injecting the light rays into the thin end of the input wedge effective to project the light rays from the corresponding thin end of the surface of the output wedge.

11. A method as described in claim 9, wherein the controlling further comprises injecting the light rays into a thin end of the input wedge effective to project the light rays from a corresponding thin end of the surface of the output wedge.

12. A display device comprising:
   a light source configured to emit light rays;
   a spatial light modulator configured to modulate the light rays;
   an input wedge configured to receive the modulated light rays from the spatial light modulator and to output the light rays at an increased fan-out angle;
   an output wedge configured to receive the light rays, at the increased fan-out angle, from the input wedge, and to project the light rays over a surface of the output wedge to generate an image, the input wedge shorter than the output wedge; and
   a controller configured to control the spatial light modulator to inject the light rays into the input wedge to cause the light rays to be projected over the surface of the output wedge to generate the image.

13. A display device as described in claim 12, wherein the input wedge and the output wedge taper in at least one direction.

14. A display device as described in claim 12, wherein the spatial light modulator comprises a phase modulator.

15. A display device as described in claim 12, wherein the spatial light modulator comprises liquid crystal displays.

16. A display device as described in claim 12, further comprising an absorption layer configured to absorb the modulated light rays from the spatial light modulator, wherein the spatial light modulator is configured to modulate an amplitude of the light rays by controlling whether the light rays reflect off of a bottom of the input wedge or are absorbed by the absorption layer.

* * * * *